(12) United States Patent
Sekiguchi et al.

(10) Patent No.: US 8,719,633 B2
(45) Date of Patent: May 6, 2014

(54) SEARCH DEVICE, SEARCH METHOD, AND SEARCH PROGRAM

(75) Inventors: Atsuji Sekiguchi, Kawasaki (JP);
Masataka Sonoda, Kawasaki (JP);
Masazumi Matsubara, Kawasaki (JP);
Yuji Wada, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 7 days.

(21) Appl. No.: 13/064,457

(22) Filed: Mar. 25, 2011

(65) Prior Publication Data

US 2011/0295891 A1 Dec. 1, 2011

(30) Foreign Application Priority Data

May 31, 2010 (JP) ................................ 2010-124577

(51) Int. Cl.
*G06F 11/00* (2006.01)
*G06F 11/07* (2006.01)
*H04L 12/24* (2006.01)

(52) U.S. Cl.
CPC ........... *G06F 11/079* (2013.01); *H04L 41/0213* (2013.01)
USPC .................. 714/25; 707/769; 714/4.1; 714/48

(58) Field of Classification Search
CPC .......................... G06F 11/079; H04L 41/0213
USPC ............ 707/959, 690, 769; 709/224; 714/4.1, 714/25, 58
See application file for complete search history.

(56) References Cited

U.S. PATENT DOCUMENTS

| 6,732,297 | B2 | 5/2004 | Oura | |
|---|---|---|---|---|
| 6,907,545 | B2 * | 6/2005 | Ramadei et al. | 714/25 |
| 8,134,920 | B2 * | 3/2012 | Imajuku et al. | 370/228 |
| 2007/0242604 | A1 * | 10/2007 | Takase et al. | 370/223 |
| 2008/0086295 | A1 * | 4/2008 | Okada et al. | 703/21 |
| 2008/0256404 | A1 | 10/2008 | Funatsu | |
| 2010/0185762 | A1 * | 7/2010 | Yasuie et al. | 709/224 |
| 2010/0211676 | A1 * | 8/2010 | Takada et al. | 709/224 |
| 2011/0213753 | A1 * | 9/2011 | Manmohan | 707/640 |

FOREIGN PATENT DOCUMENTS

| JP | HEI02-244338 | 9/1990 |
|---|---|---|
| JP | HEI06-324904 | 11/1994 |
| JP | 2001-222442 | 8/2001 |
| JP | 2007-011823 | 1/2007 |
| JP | 2008-089549 | 4/2008 |

OTHER PUBLICATIONS

U.S. Appl. No. 12/977,583, filed Dec. 23, 2010, Masataka Sonoda et al., Fujitsu Limited.

* cited by examiner

*Primary Examiner* — Cheyne D Ly
(74) *Attorney, Agent, or Firm* — Staas & Halsey LLP

(57) ABSTRACT

When searching for a starting point candidate on an abnormality occurred in a first management range, if a search destination extends over a second management range, a first search device transmits a query to a second search device and requests a second search device to search for a starting point of an abnormality in the second management range. The second search device receives the query, searches the second management range for a starting point candidate of an abnormality, replaces a starting point candidate of an abnormality with a dummy configuration item, and transmits a response. Thus, the first search device can search for a starting point candidate of an abnormality without grasping a connection relationship of configuration items in the second management range.

6 Claims, 16 Drawing Sheets

| ITEM | DATA |
|---|---|
| QUERY ID | 100 |
| ABNORMALITY CONTENT | RESPONSE TIME DETERIORATION |
| TIME RANGE | 2009/12/01 12:00:00 TO 2009/12/01 18:00:00 |
| RELATION | r01 |

D2

| VCI | SCORE |
|---|---|
| V001 | 3 |
| V002 | 1 |

D3

| CI NAME | LOCATION |
|---|---|
| CLOUD NODE | EXTERNAL |

D4

| QUERY ID | CI | VCI |
|---|---|---|
| 100 | SW2 | V001 |
| 100 | PM2 | V002 |
| 101 | SW2 | V003 |

D5

| CI | SCORE |
|---|---|
| V001 | 9 |
| V002 | 3 |
| SW2 | 1 |

CIs THAT ARE LIKELY TO BE STARTING POINTS OF ABNORMALITY ARE AS FOLLOWS

| CI | RESPONSIBILITY SOURCE |
|---|---|
| App2 | INSIDE MANAGEMENT RANGE (OWN DOMAIN) |
| App1 | INSIDE MANAGEMENT RANGE (OWN DOMAIN) |
| ... | ... |

D7

CIs THAT ARE LIKELY TO BE STARTING POINTS OF ABNORMALITY ARE AS FOLLOWS

| CI | RESPONSIBILITY SOURCE |
|---|---|
| V001 | OUTSIDE MANAGEMENT RANGE (OWN DOMAIN) |
| V002 | OUTSIDE MANAGEMENT RANGE (OWN DOMAIN) |
| ... | ... |

SEARCH DEVICE, SEARCH METHOD, AND SEARCH PROGRAM

CROSS-REFERENCE TO RELATED APPLICATION

This application is based upon and claims the benefit of priority of the prior Japanese Patent Application No. 2010-124577, filed on May 31, 2010, the entire contents of which are incorporated herein by reference.

FIELD

The embodiments discussed herein are directed to a search device, a search method, and a search program, which search for a candidate of a starting point of abnormality occurred in a system.

BACKGROUND

In a network system including a plurality of configuration items connected to each other, if an abnormality occurs in a configuration item, the abnormality may be spread to other configuration items. Thus, even if an abnormality has been detected on a specific configuration item, the root (the starting point) of the cause of the abnormality is likely to be a configuration item other than the specific configuration item.

Reference may be made to, for example, Japanese Laid-open Patent Publication No. 02-244338, Japanese Laid-open Patent Publication No. 06-324904, and Japanese Laid-open Patent Publication No. 2001-222442.

However, if information on all configuration items in the network and all information of their causal relationships are not managed in an integrated fashion, it is difficult to perform a search for the root (the starting point) of the abnormality, and the problem becomes more prominent as the size of the network is larger.

SUMMARY

According to an aspect of an embodiment of the invention, A search device includes a search unit that, on an abnormality occurred in a configuration item belonging to a first management range among configuration items of a network, traces a connection relationship of a configuration item in which the abnormality has occurred and searches for a candidate of a configuration item that is a starting point of the abnormality as a starting point candidate of the abnormality; a query issuing unit that issues a query that requests a device, which searches for a starting point of an abnormality in a second management range, to search for the starting point candidate of the abnormality when a configuration item of a point traced by the search unit is a configuration item belonging to the second management range; and an evaluation unit that evaluates the starting point candidate of the abnormality based on a search result of the search unit and a response to the query.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 9 is an explanation diagram for explaining a concrete example of data;

FIG. 10 is an explanation diagram for explaining a screen example representing an evaluation result on an abnormality starting point candidate;

DESCRIPTION OF EMBODIMENTS

Preferred embodiments of the present invention will be explained with reference to accompanying drawings. The present invention is not limited to the exemplary embodiments.

[a] First Embodiment

Configuration of First Exemplary Embodiment

Figure 1:
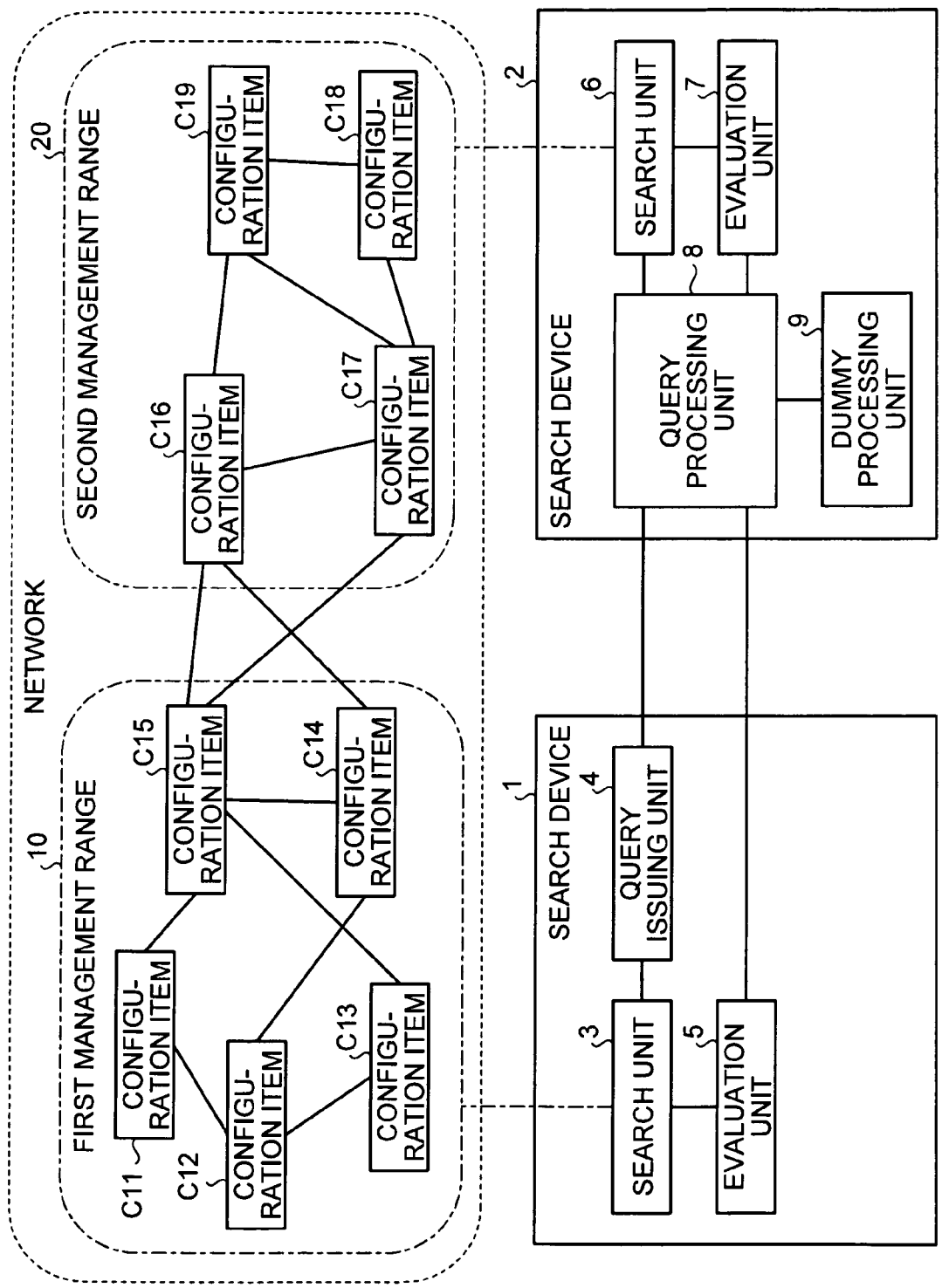
FIG. 1 illustrates a configuration example of a system including a search device according to a first exemplary embodiment.

FIG. 1 illustrates a configuration example of a system including a search device according to a first exemplary embodiment. In the system illustrated in FIG. 1, configuration items C11 to C19 are included in a network. In this example, it is assumed that among the configuration items C11 to C19, the configuration items C11 to C15 belong to a first management range 10 and the configuration items C16 to C19 belong to a second management range 20. Further, configuration items other than the configuration items illustrated in FIG. 1 may be further included in the network, and the configuration items may belong to a single management range or be divided so as to belong to three or more management ranges.

A search device 1 searches for and evaluates a candidate of a configuration item that is likely to be a starting point of an abnormality, as an abnormality starting point candidate, with respect to an abnormality occurred in the configuration items C11 to C15 belonging to the first management range 10.

The search device 1 includes a search unit 3, a query issuing unit 4, and an evaluation unit 5. The search unit 3 searches for the abnormality starting point candidate with respect to the abnormality occurred in the configuration items C11 to C15 belonging to the first management range 10 by tracing a connection relationship of the configuration item in which the abnormality has occurred based on connection information between the configuration items managed by the search device 1. The query issuing unit 4 issues a query for requesting a search device 2 to search for the abnormality starting point candidate when a configuration item of a point traced by the search unit 3 is a configuration item belonging to the second management range 20. The evaluation unit 5 evaluates the abnormality starting point candidate based on the search result of the search unit 3 and a response to the query issued by the query issuing unit 4.

The search device 2 includes a search unit 6, an evaluation unit 7, and a query processing unit 8. The query processing unit 8 receives the query from the search device 1. The search unit 6 searches for the abnormality starting point candidate by tracing connection relationships of the configuration items C16 to C19 belonging to the second management range based on connection information between the configuration items managed by the search device 2 and the received query.

The evaluation unit 7 evaluates the abnormality starting point candidate based on the search result of the search unit 6 and transmits the evaluation result to the search device 1 as the response to the query.

Summary of First Exemplary Embodiment

As described above, when searching for the starting point candidate on the abnormality occurred in the first management range, if a search destination extends over the second management range, the search device 1 transmits the query to the search device 2 and requests the search device 2 to search for the starting point in the second management range.

The search device 2 receives the query, searches for the abnormality starting point candidate in the second management range, and transmits the response. As a result, the search device 1 can effectively perform the search on the abnormality starting point even if it does not manage detailed information on the configuration items in the second management range and the connection relationship between the configuration items.

Further, in the above described exemplary embodiment, a dummy processing unit 9 of the search device 2 can replace the configuration item that is the abnormality starting point candidate searched by the search unit 6 with a dummy configuration item (information that is neither identification information specific to the configuration item in the second management range nor persistent identification information) and transmit information on the dummy configuration item and an evaluation result on the dummy configuration item from the query processing unit 8 to the search device 1 as a response. For example, as the dummy configuration item, non-persistent identification information may be used. Since the information of the dummy configuration item is the non-persistent identification information, when performing another process of searching for another abnormality starting point after performing the process of searching for the abnormality starting point, the identification information may be changed. For example, the identification information may be changed when query identification information included in the query is changed or when a predetermined time elapses.

As a result, the search device 1 can search for the abnormality starting point candidate even if it does not grasp the configuration items in the second management range and the connection relationship between the configuration items. That is, it is possible to make the search device 1 search for the abnormality starting point candidate while concealing the configuration items in the second management range and the connection relationship between the configuration items in the second management range from the search device 1. Further, the search device 1 stores a relation identifier r01 in association with the configuration item C14 at an edge part of the first management range and stores a relation identifier r02 in association with the configuration item C15 (they may be stored by registering them to a configuration management database (CMDB)). The search device 2, which is a second device, stores the configuration items C16 and C17 at an edge part of the second management range in association with r01 and stores the configuration item C16 at an edge part of the second management range in association with r02. Thus, when the search destination extends from the configuration item C14 in the first management range up to the second management range side, by including the identification information r01 in the query, even if both the first device and the second device do not recognize that there is a connection relationship between C15 and C16 and between C15 and C17, a path to search can be specified. That is, when r01 is included in the query, the search device 2 can perform the search on the abnormally starting point candidate by tracing a path including the configuration items C16 and C17.

[b] Second Embodiment

Configuration of Exemplary Embodiment

Figure 2:
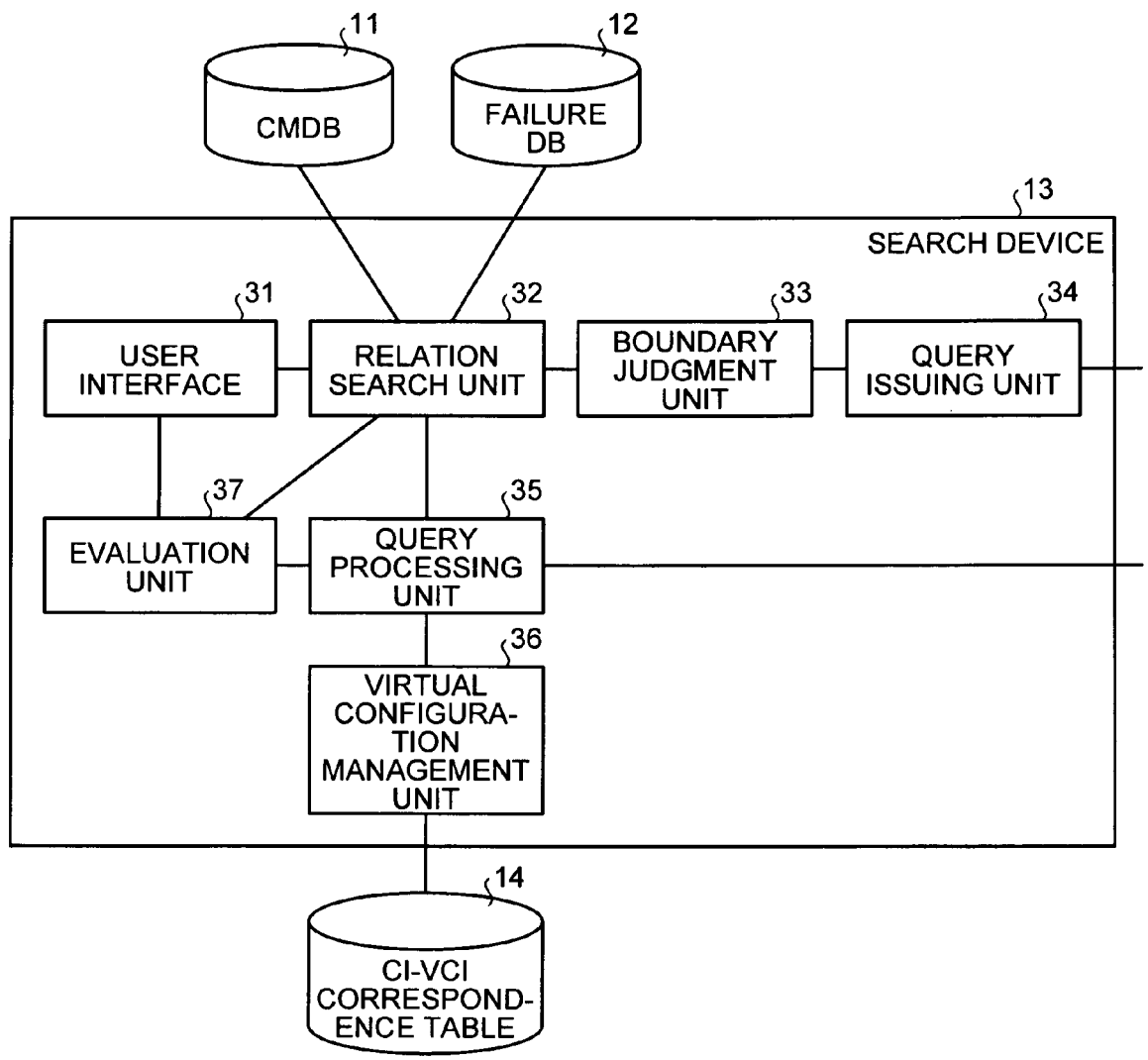
FIG. 2 is a configuration diagram of a search device according to a second exemplary embodiment.

FIG. 2 is a configuration diagram of a search device 13 according to a second exemplary embodiment. The search device 13 illustrated in FIG. 2 includes a user interface 31, a relation search unit 32, a boundary judgment unit 33, a query issuing unit 34, a query processing unit 35, a virtual configuration management unit 36, and an evaluation unit 37. The search device 13 can refer to a configuration management database (CMDB) 11, a failure database(DB) 12 and a configuration item (CI)-virtual configuration item (VCI) correspondence table 14. The DB and the correspondence table are stored in a storage device. Further, the search device 13 is connected to another search device 23 illustrated in FIG. 3.

Figure 3:
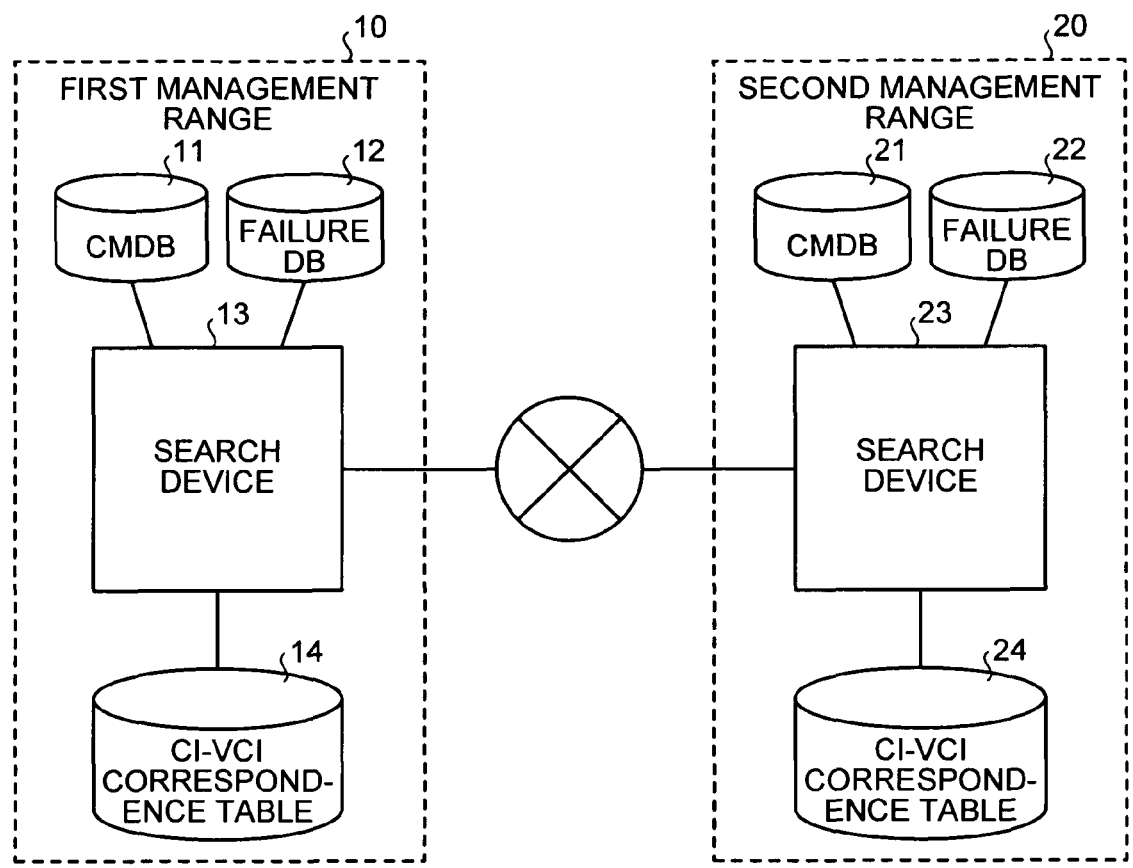
FIG. 3 is an explanation diagram for explaining a connection between search devices.
Figure 4:
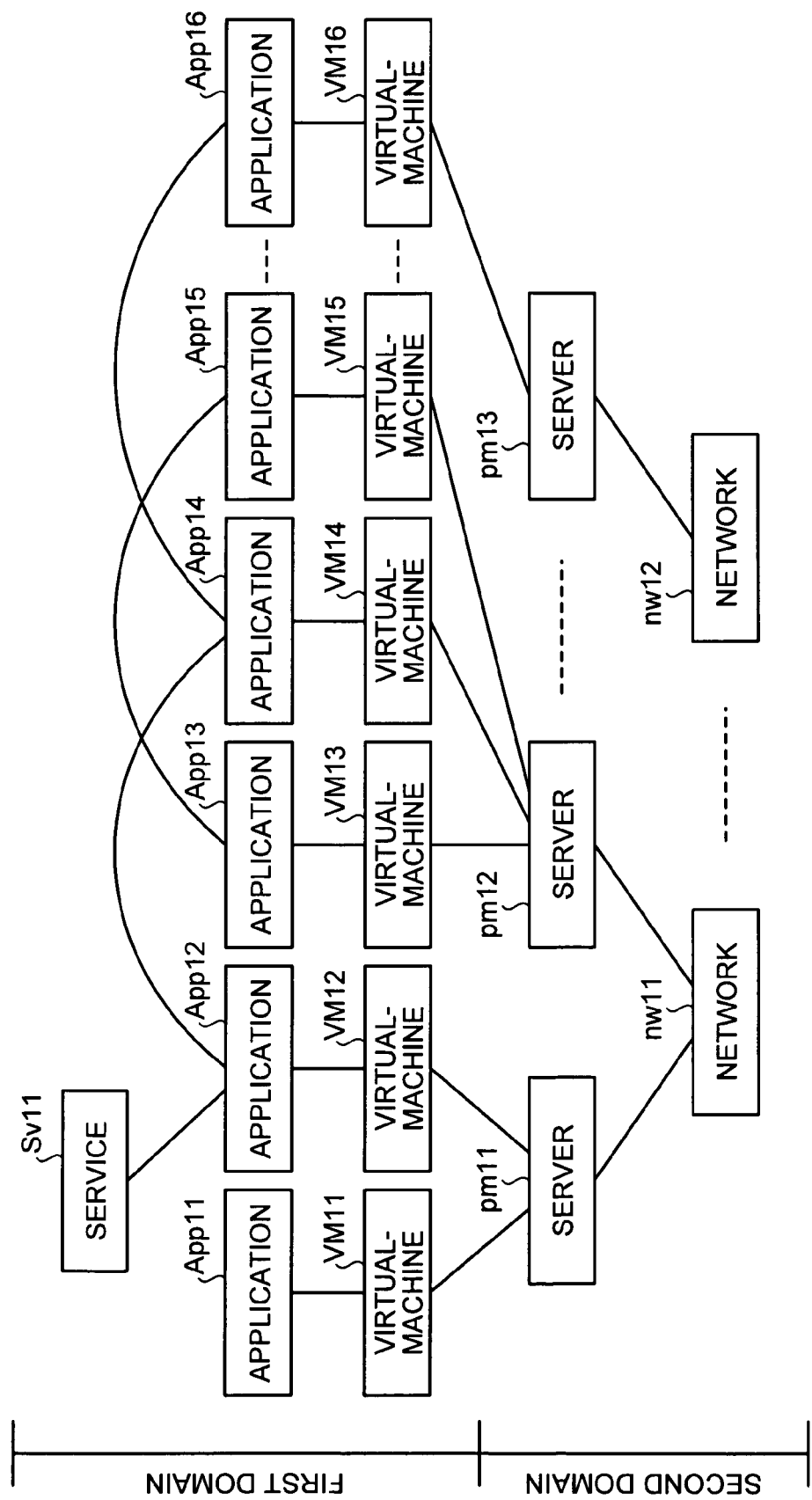
FIG. 4 is an explanation diagram for explaining a network system that straddles a plurality of domains.

FIG. 3 is an explanation diagram for explaining a connection between the search devices, and FIG. 4 is an explanation diagram for explaining a network system that straddles a plurality of domains. In the network system illustrated in FIG. 4, servers pm11 and pm12 that are physical machines are connected to a network nw11. The server pm11 executes a virtual machine program and operates as virtual machines VM11 and VM12. An application App11 operates on the virtual machine VM11. Similarly, an application App12 operates on the virtual machine VM12.

Further, the server pm12 executes a virtual machine program and operates as virtual machines VM13 to VM15. An application App13 operates on the virtual machine VM13. An application App14 operates on the virtual machine VM14, and an application App15 operates on the virtual machine VM15. Similarly, a server pm13 connected to a network nw12 executes a virtual machine program and operates as a virtual machine VM16. An application App16 operates on the virtual machine VM16.

Further, the application App13 uses the application App15, and the application App14 uses the application App16. The application App12 provides a service Sv11 using the application App14.

In this network system, the networks nw11 and nw12, the servers pm11 to pm13, the virtual machines VM11 to VM16, the applications App11 to App16, and the service Sv11 are used as the configuration items (CI). Further, a connection relationship between the configuration items is used as an example of a relation. The relation includes a direction of a use relationship between the configuration items as information. Specifically, by defining a configuration item at a used side as a source and a configuration item at a using side as a target, for example, a direction from the source to the target is decided. Information on a relation with a configuration item of a system can be included in configuration information.

A configuration of the network system illustrated in FIG. 4 is a cloud environment in which the servers pm11 to pm13 that are the physical machines execute the virtual machine program and operate as the virtual machines VM11 to VM16, the applications App11 to App16 operate on the virtual machines, and so the service Sv11 is provided.

In this example, it is assumed that a user of the cloud environment does not recognize the virtual machines VM11 to VM16, the applications App11 to App16, and the service Sv11 as the configuration items and do not know about the physical configuration items such as the networks nw11 and nw12 and the servers pm11 to pm13. Further, it is assumed that a provider of the cloud environment does not disclose information on the physical configuration items such as the networks nw11 and nw12 and the servers pm11 to pm13.

It is assumed that when an abnormality occurs in the network system illustrated in FIG. 4, if the abnormality starting point is the physical configuration item such as the networks nw11 and nw12 and the servers pm11 to pm13, the provider side performs management (has management responsibility). However, it is assumed that if the abnormality starting point is the configuration item such as the Applications App11 to App16 and the service Sv11, the user side performs management (has management responsibility).

As described above, the user side of the cloud environment has responsibility for management of the applications App11 to App16 and the service Sv11 and has their detailed configuration information. The provider side of the cloud environment has responsibility for management of the networks nw11 and nw12 and the servers pm11 to pm13 and has their detailed configuration information. Here, a range of managing the configuration items of the network is referred to as a domain. In the example illustrated in FIG. 4, a first domain is a management range at the user side, and a second domain is a management range at the provider side. Further, a definition of the domain is not limited to this example and can variously be changed according to a use form of a system.

The configuration information of the second domain side may be concealed from the first domain side, and the configuration information of the first domain side may be concealed from the second domain side. As illustrated in FIG. 3, the search device 13 is disposed in the first domain side system, the search device 23 is disposed in the second domain side system, and the evaluation and search on the abnormality starting point are performed in each domain.

The search device 13 disposed in the first domain side system is connected to storage devices that store the CMDB 11, the failure DB 12, and the CI-VCI correspondence table 14, respectively and can have an access to a variety of stored data. The CMDB 11 is a database that stores the configuration items of the first domain, and the failure DB 12 is a database that stores information on various abnormalities occurred in the configuration item belonging to the first domain as failure information. The CI-VCI correspondence table 14 is a table that represents a correspondence relationship between a dummy configuration item to be responded to the second domain when the search on the abnormality starting point candidate is requested from the second domain side and an actual configuration item of the first domain. When a query that designates the dummy configuration item has been received from the second domain side, since an actual configuration item corresponding to the dummy configuration item can be specified using the CI-VCI correspondence table 14, it can be investigated whether or not the specified actual configuration item has gotten out of an abnormal state, and the investigation result can be transmitted to the second domain side. Preferably, the dummy configuration item is registered to the CI-VCI correspondence table in association with the identification information of the query, and the dummy information can be used on the same configuration item when responding to different queries.

The search device 23 disposed in the second domain side system is connected to storage devices that store a CMDB 21, a failure DB 22, and a CI-VCI correspondence table 24, respectively and can access a variety of stored data. The CMDB 21 is a database that stores the configuration items of the second domain, and the failure DB 22 is a database that stores information on various abnormalities occurred in the configuration item belonging to the second domain as failure information. The CI-VCI correspondence table 24 is a table that represents a correspondence relationship between a dummy configuration item to be responded to the first domain when the search on the abnormality starting point candidate is requested from the first domain side and an actual configuration item of the second domain. When a query that designates the dummy configuration item has been received from the first domain side, since an actual configuration item corresponding to the dummy configuration item can be specified using the CI-VCI correspondence table 24, it can be investigated whether or not the specified actual configuration item has gotten out of an abnormal state, and the investigation result can be transmitted to the first domain side. Preferably, the dummy configuration item is registered to the CI-VCI correspondence table in association with the identification information of the query, and the dummy information can be used on the same configuration item when responding to different queries.

The search device 13 and the search device 23 are connected to each other via the network and can transmit the query and receive the response. The search device 13 and the search device 23 may have the same configuration. Here, it is assumed that the search device 13 and the search device 23 have the same configuration. Thus, a description on a configuration of the search device 13 illustrated in FIG. 3 will be made, and a description on the search device 23 will be omitted.

The user interface 31 illustrated in FIG. 2 is an input/output (I/O) processing unit that receives an input for instructing a start of evaluation on the abnormality starting point candidate from the user of the search device 13 and outputs the evaluation result on the abnormality starting point candidate.

The relation search unit 32 searches for the abnormality starting point candidate by referring to the CMDB 11 and the failure DB 12. Specifically, the relation search unit 32 selects the configuration item in which the abnormality has been occurred from the failure DB 12. On the selected configuration item, the relation in which the configuration item is set is traced in a reverse direction with reference to the CMDB 11. That is, the relation search unit 32 traces the relation that targets the selected configuration item toward the source side. The relation search unit 32 selects the configuration item in which the abnormality has occurred at the most upstream side among the configuration items present on a path in which the relation has been traced as the abnormality starting point candidate.

Figure 5:
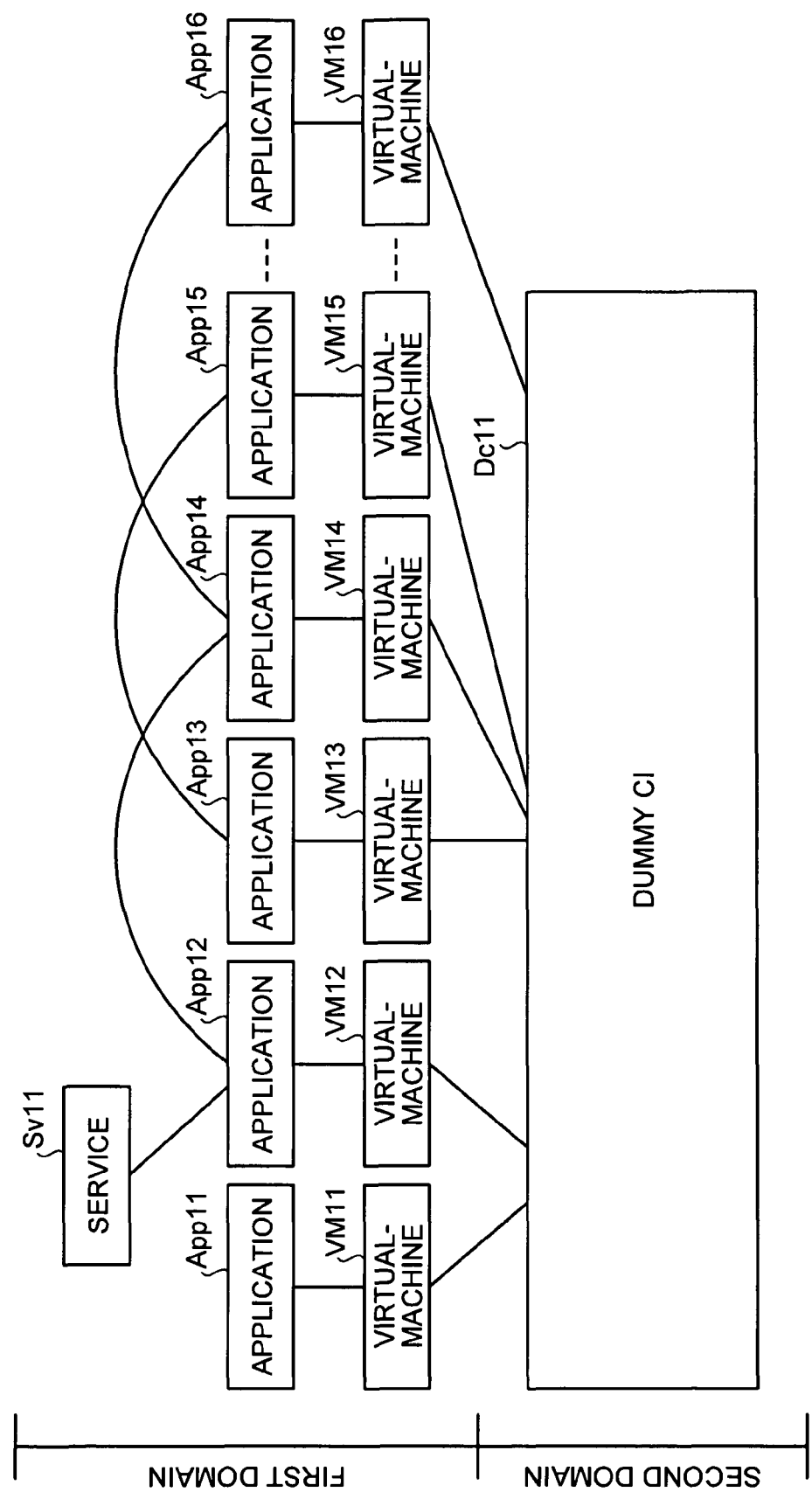
FIG. 5 is an explanation diagram for explaining a replacement of a domain to a virtual configuration item.

The boundary judgment unit 33 judges whether or not the relation traced by the relation search unit 32 is a relation that strides over the boundary between the first domain and the second domain. Specifically, the second domain is registered to the CMDB 11 as one virtual configuration item, i.e., a dummy CI Dc11 as illustrated in FIG. 5. The boundary judgment unit 33 judges that the relation is the relation that strides over the boundary between the first domain and the second domain when the source of the relation traced by the relation search unit 32 is the dummy CI Dc11.

The query issuing unit 34 issues the query to the search device 23 when the boundary judgment unit 33 judges that the relation traced by the relation search unit 32 is the relation that strides over the boundary. At this time, when a point obtained by tracing the virtual machine VM11 is Dc11, the query preferably include identification information representing a relation between VM11 and Dc11.

The query processing unit 35 receives a query response from the search device 23 and transfers the query response to the evaluation unit 37.

The evaluation unit 37 evaluates the abnormality starting point candidate based on the search result of the abnormality starting point candidate acquired by the relation search unit 32 and the content of the query response acquired by the query processing unit 35. Specifically, the evaluation unit 37 calculates and aggregates scores of the configuration items that are listed as the abnormality starting point candidates. For example, as a technique of obtaining the score, $$\text{the score of a configuration item} = \text{the number of own abnormalities} + \text{the score of a configuration item at a downstream side in a relation} \quad (1)$$

may be used. That is, a configuration item at the most upstream side among the configuration items in which the abnormality has occurred is selected as the starting point candidate and a result of collecting the starting point candidate and its score may be used as the evaluation result. The configuration item having the high score is evaluated as having a high possibility to be the abnormality starting point. The evaluation unit 37 outputs the evaluation result through the user interface 31.

The query processing unit 35 receives the query from the search device 23 and requests the relation search unit 32 to search for the abnormality starting point candidate. The query processing unit 35 acquires the evaluation result from the evaluation unit 37 on the abnormality starting point candidate searched by the relation search unit 32 based on the query received from the search device 23. The query processing unit 35 replaces the abnormality starting point candidate searched by the relation search unit 32 with the dummy configuration item and transmits the dummy configuration item and the evaluation result as a response to the query received from the search device 23.

The virtual configuration management unit 36 is a processing unit that manages a relationship between the actual configuration item of the first domain and the dummy configuration item. For example, the virtual configuration management unit 36 refers to the CI-VCI correspondence table 14 based on the identification information of the query received from the search device 23 and the configuration item of the first domain that is a replacement target.

If a dummy configuration item corresponding to a combination of the identification information of the query and the configuration item of the first domain that is a replacement target has been registered, the virtual configuration management unit 36 notifies the query processing unit 35 of the corresponding dummy configuration item. Further, if a dummy configuration item corresponding to the combination of the identification information of the query and the configuration item of the first domain that is a replacement target has not been registered, the virtual configuration management unit 36 newly registers the dummy configuration item. Specifically, the virtual configuration management unit 36 newly registers the dummy configuration item to the CI-VCI correspondence table 14 in association with the combination of the identification information of the query and the configuration item of the first domain that is a replacement target and notifies the query processing unit 35 of the dummy configuration item. The dummy configuration item is registered for each pieces of query identification information, and whether or not the dummy configuration has been registered can be judged with reference to the correspondence table corresponding to the identification information of the query. As a result, since the correspondence table in which a different correspondence relationship is applied for each piece of query identification information can be applied, it can be avoided that relativity between the configuration items is disclosed due to an accumulation of the response to the query.

As described above, the search device 13 virtualizes the configuration of the first domain by transmitting the dummy configuration item on the query from the search device 23. For this reason, the search device 13 can notify the search device 23 of the abnormality starting point candidate through the virtual configuration while concealing the actual configuration of the first domain.

Similarly, the search device 23 responds to the query through the virtual configuration while concealing the actual configuration of the second domain from the search device 13.

Therefore, the configurations of the first domain and the second domain are not known to each other, and it is possible to investigate in which side the abnormality has occurred, that is, which of the first domain and the second domain has responsibility.

Explanation of Processing Operation

Figure 6:
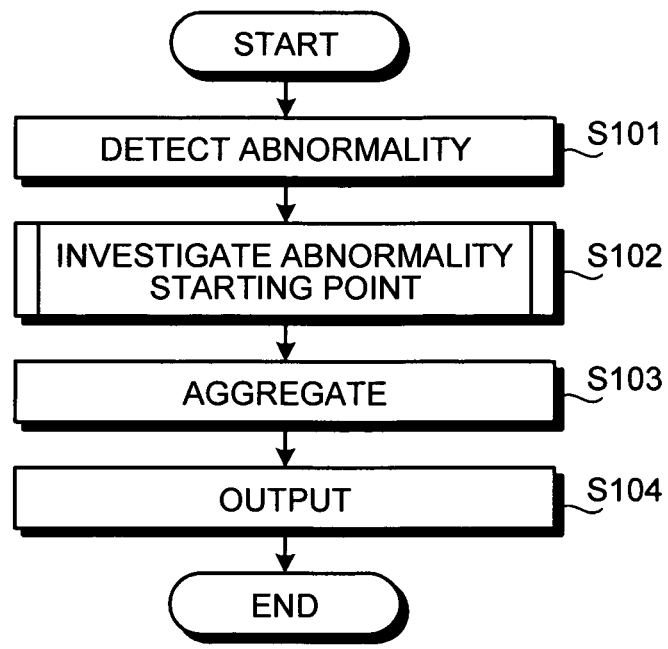
FIG. 6 is a flowchart for explaining a process related to evaluation of an abnormality starting point candidate.

FIG. 6 is a flowchart for explaining a process related to evaluation of the abnormality starting point candidate. As illustrated in FIG. 6, a device that monitors a status of the network first detects an abnormality of its own domain (step S101). The device that detects the abnormality may be a search device or any other monitoring device. The device that has detected the abnormality registers the detection result to the failure DB of its down domain.

Next, the search device performs an abnormality starting point investigation process with reference to the failure DB of its own domain (step S102), aggregates the result (step S103), and outputs the result (step S104).

The abnormality detection (step S101) is preferably performed as preferable. The abnormality starting point investigation process (step S102) may be performed at timing designated by the user or may be performed at a regular interval. Further, the abnormality starting point investigation process may be performed in conjunction with the abnormality detection.

Figure 7:
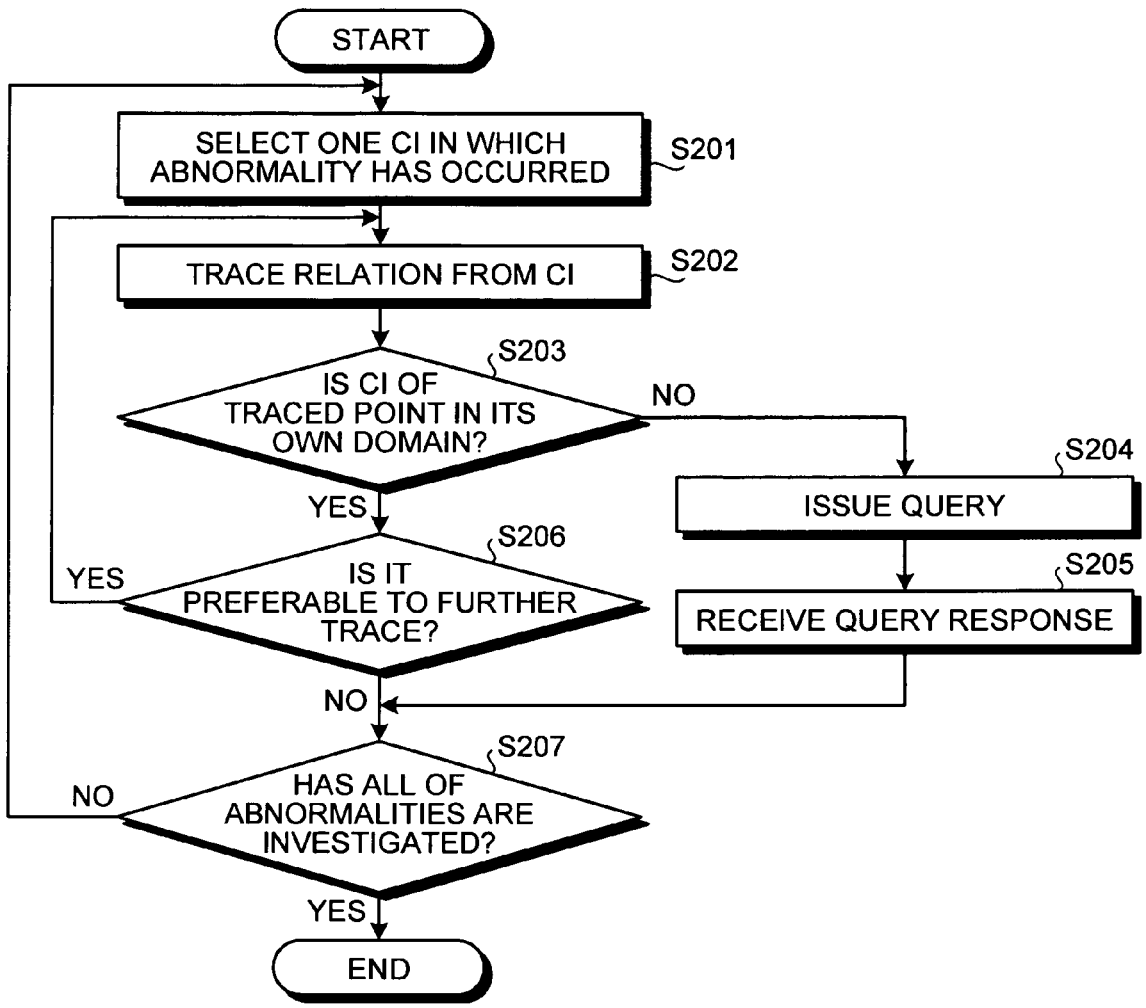
FIG. 7 is a flowchart for explaining an abnormality starting point investigation process.

FIG. 7 is a flowchart for explaining the abnormality starting point investigation process (step S102). A description will be made in connection with an example in which subsequent processes are executed by the search device 13. The relation search unit 32 of the search device 13 that has started the abnormality starting point investigation process selects one of the configuration items (CI) in which the abnormality has occurred with reference to the failure DB 12 (Step S201). At this time, the relation search unit 32 prioritizes selection according to a kind of the configuration item in which abnormality has occurred. Specifically, if the abnormality has occurred in the configuration item whose kind is a service, the configuration item is preferentially selected, and the configuration item whose kind is an application is next preferentially selected. Similarly, the configuration items are selected in an order of the virtual machine, the physical machine, a switch, and a router. Since selection is performed based on the kind of the configuration item, selection can be performed in order starting from the configuration item having a high possibility positioned at the downstream side in the network system.

The relation search unit 32 traces a relation in a reverse order starting from the selected configuration item (step S202). That is, the configuration item in which the abnormality has occurred searches for the configuration item that has caused the abnormality. The boundary judgment unit 33 judges whether or not the configuration item of the traced point is the configuration item in its own domain (step S203). If the configuration item of the traced point is not the configuration item in its own domain (No in step S203), the query issuing unit 34 issues the query (step S204), and the query processing unit 35 receives the response to the issued query (step S205).

If the configuration item of the traced point is the configuration item in its own domain (Yes in step S203), the relation search unit 32 judges whether or not it is preferable to further trace the relation (step S206). For example, a judgment on whether or not it is preferable to further trace the relation may be performed by deciding the number of relations traced from the selected configuration item. The number of traced relations is referred to the number of hops, and a maximum value of the number of relations to trace is referred to as the maximum number of hops. For example, when the maximum number of hops is decided as 3, up to 3 relations are traced starting from the selected configuration item. When there is a plurality of relations that target on the selected configuration item or when there is a plurality of relations that targets the configuration item of the traced point, each of paths is traced. Further, the relation may be traced by performing weighting according to a kind of an error or a kind of the configuration item.

When it is judged that it is preferable to further trace a relation (Yes in step S206), the relation search unit 32 returns to step S202 and further traces the relation starting from the configuration item of the traced point. When it is judged that it is not preferable to further trace the relation (No in step S206), the relation search unit 32 judges whether or not an investigation has been performed on all of abnormalities registered to the failure DB 12 (step S207). At this time, the relation search unit 32 can regard as an investigation on the abnormality of the configuration item reached by tracing the relation starting from any other configuration item has been completed.

When the abnormality that has not been investigated remains (No in step S207), the relation search unit 32 returns to step S201 and selects one configuration item that in which the abnormality has occurred. When the investigation has been performed on all of abnormalities registered to the failure DB 12 (Yes in step S207), the search device 13 finishes the abnormality starting point investigation process.

Figure 8:
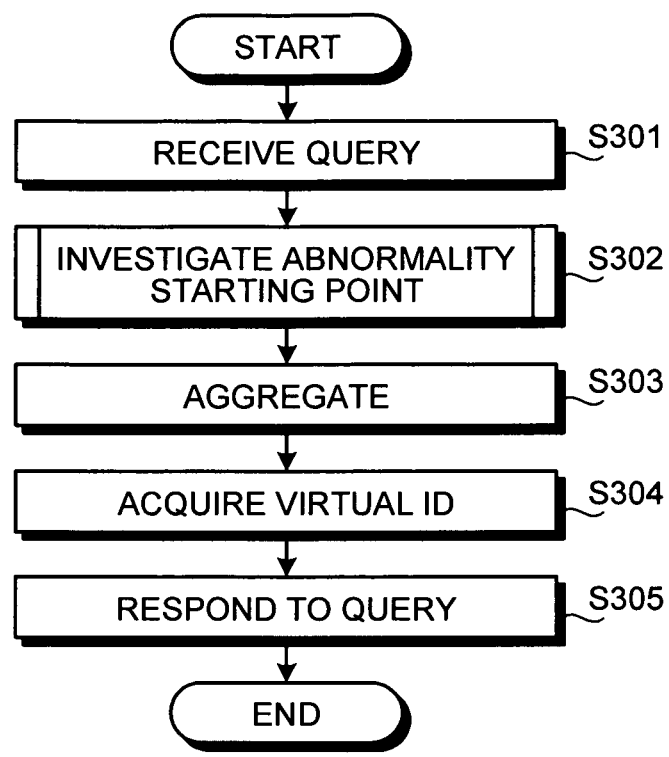
FIG. 8 is a flowchart for explaining a processing operation of a search device that has received a query.

FIG. 8 is a flowchart for explaining a processing operation of the search device that has received the query. In FIG. 8, a description will be made in connection with a case in which the search device 13 receives the query from another search device. The query processing unit 35 receives the query (step S301) and requests the relation search unit 32 to search for the abnormality starting point candidate based on the received query. The relation search unit 32 performs the abnormality starting point investigation based on the identification information (see a relation r01 of FIG. 9) and the abnormality that are indicated in the query (step S302). The evaluation unit 37 aggregates and evaluates the search result of the relation search unit 32 (step S303). The query processing unit 35 transfers the starting point candidate obtained as the search result of the relation search unit 32 to the virtual configuration management unit 36. The virtual configuration management unit 36 acquires a virtual ID that is identification information of the dummy configuration item on the starting point candidate and transmits the virtual ID to the query processing unit 35 (step S304).

The query processing unit 35 associates the virtual ID obtained from the virtual configuration management unit 36 with the evaluation result of the evaluation unit 37 and transmits the virtual ID and the evaluation result to a transmission source of the query as the query response (step S305) and finishes the process. Further, the details of the abnormality starting point investigation (step S302) are the same as the process illustrated in FIG. 7.

Example of Various Data

FIG. 9 is an explanation diagram for explaining a concrete example of data. A query D1 illustrated in FIG. 9 includes items such as a query ID, an abnormality content, a time range, and a relation. In the example of FIG. 9, the query ID is 100, the abnormality content is a response time stop, the time range is from 2009/12/01 12:00:00 to 2009/12/01 18:00:00, and the relation identification information is r01. Further, a domain of a transmission source can specify the configuration item corresponding to the domain of the transmission source based on the relation identification information r01, and a domain of a transmission destination can specify the configuration item corresponding to the domain of the transmission destination based on the relation r01.

That is, the item of the relation is a relation that straddles over the domain of the transmission source of the query and the domain of the transmission destination, and the abnormality starting point investigation when the query has been received searches for the abnormality starting point candidate starting from the configuration item that is the source of the relation. As described above, it is not preferable to indicate the configuration of the domain of the transmission source in the query, and information related to the relation that straddles over the domain and the abnormality are preferably included in the query. For this reason, by transmitting the query, the abnormality starting point candidate can be searched while concealing the configuration of the transmission source from the domain of the transmission destination.

A query response D2 includes items such as a VCI and a score. The VCI is an item representing an ID of the dummy configuration item, and the score is an evaluation result of the dummy configuration item.

External CI information D3 is a concrete example of configuration information of another domain registered to a configuration information DB. A cloud node is registered as a CI name, and a position represents an external domain outside it own domain.

A CI-VCI correspondence table D4 is an example of a CI-VCI correspondence table. The query ID is retained in association with an ID of a CI that is an actual configuration item and an ID of a VCI that is a virtual configuration item. In the example of FIG. 9, the query ID 100 is retained in association with SW2 as the CI and V001 as the VCI. Further, the query ID 100 is retained in association with PM2 as the CI and V002 as the VCI. Further, the query ID 101 is retained in association with SW2 as the CI and V003 as the VCI.

The CI-VCI correspondence table uses the same correspondence relationship on the same query. However, when an ID of the query is different, a different correspondence relationship is used to associate different VCIs with the same CI (SW2 in the example of FIG. 9). For this reason, since the virtual configuration is uniquely decided for each ID of the query, the abnormality starting point candidate can be exactly evaluated through the virtual configuration, and it is possible to make it difficult to estimate the actual configuration by a plurality of queries.

A score table D5 is a concrete example of the evaluation result of the evaluation unit and has a configuration in which an ID of a CI is associated with the score. In the score table D5, the score of V001 is 9, the score of V002 is 3, and the score of SW2 is 1. Thus, in the score table D5, it is inferred that V001 having the highest score is the abnormality starting point. Since V001 is the virtual configuration item obtained as the query response from another domain, if V001 is the starting point of abnormality, it is inferred that the occurrence of abnormality has not started from its own domain side.

FIG. 10 is an explanation diagram for explaining a screen example representing the evaluation result on the abnormality starting point candidate. Screen examples D6 and D7 illustrated in FIG. 10 display information of an ID of a CI and a responsibility source together with a message "CIs in which a possibility to be the starting point of abnormality is high are as follows." For example, two configuration items that are highest in score are preferably regarded as configuration items in which a possibility to be the starting point of abnormality is high.

The screen example D6 displays App2 and App1 as CIs in which a possibility to be the starting point of abnormality is high and represents that both App2 and App1 are within the management range of its own domain. The screen example D7 displays V001 and V002 as CIs in which a possibility to be the starting point of abnormality is high and represents that both V001 and V002 are out of the management range of its own domain.

Concrete Example of Abnormality Starting Point Candidate Search

FIGS. 11 to 14 are explanation diagrams for explaining examples of the abnormality starting point candidate search. In a network system illustrated in FIG. 11, a system 41 is connected with a system 42. The system 41 includes a router RT1, a switch SW1, a physical machine PM1, an application App1, and a service SVC1. The system 42 includes a router RT2, a switch SW2, physical machines PM2 and PM3, virtual machines VM1 to VM3, and applications App2 to App4.

The router RT1 is connected with the router RT2 to allow communication between the systems 41 and 42. The switches SW1 and SW2 are connected with the physical machines and the routers within the same system, respectively. The application App1 operates on the physical machine PM1.

The virtual machines VM1 and VM2 operate on the physical machine PM2. Similarly, the virtual machine VM3 operates on the physical machine PM3. The applications App2 to App4 operate on the physical machines PM1 to PM3, respectively.

The service SVC1 is a service that is provided using the applications App1 to App4.

Figure 11:
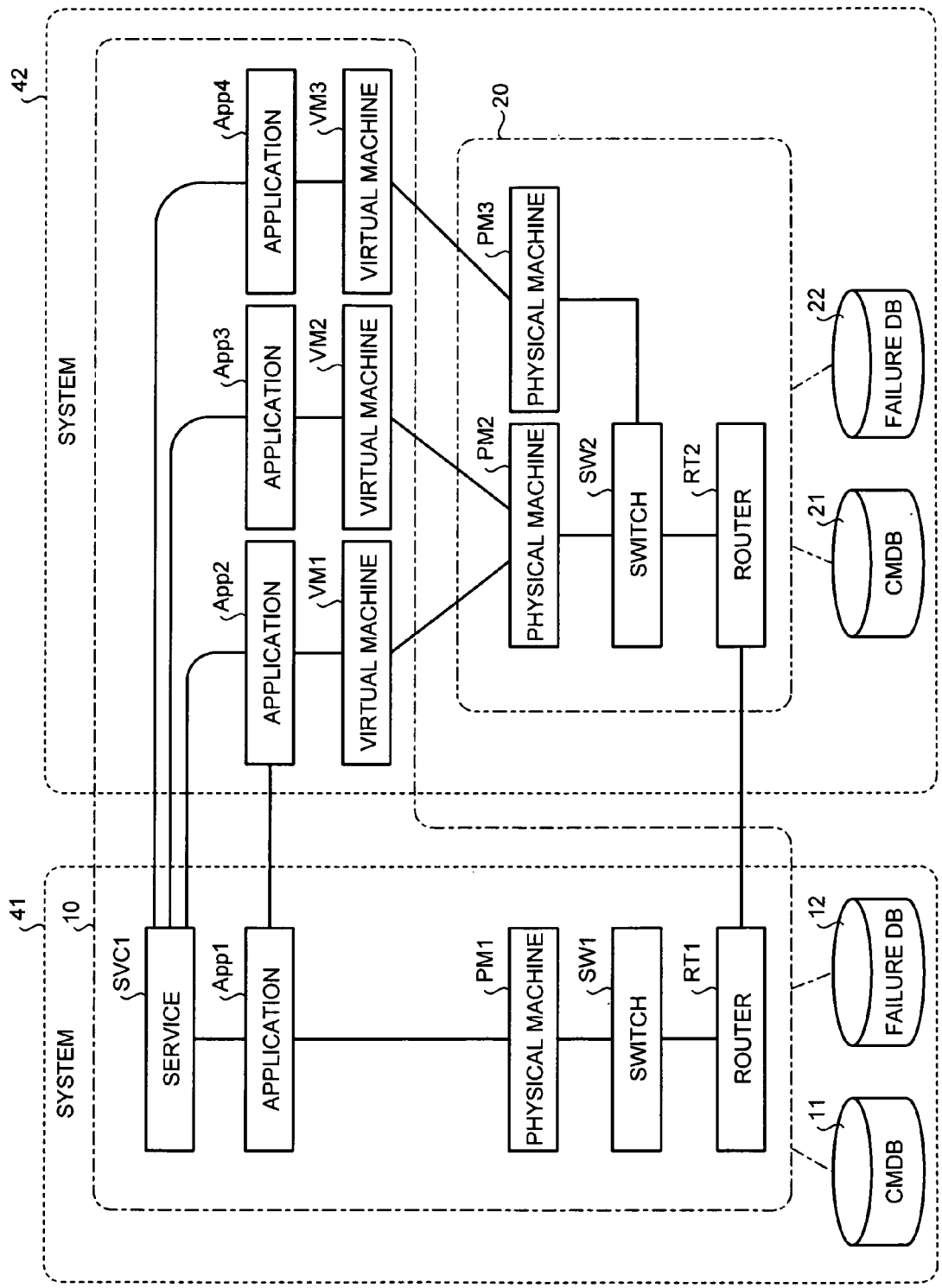
FIG. 11 is an explanation diagram for explaining a concrete example of a search for an abnormality starting point candidate (first)

In the network system illustrated in FIG. 11, the router RT1, the switch SW1, the physical machine PM1, the applications App1 to App4, the virtual machines VM1 to VM3, and the service SVC1 are included in the first management range 10. Further, the router RT2, the switch SW2, and the physical machines PM2 and PM3 are included in the second management range 20. The configuration information of the first management range 10 is retained in the CMDB 11, and information related to the abnormality that has occurred within the first management range 10 is retained in the failure DB 12.

Similarly, the configuration information of the second management range 20 is retain in the CMDB 21, and information related to the abnormality that has occurred within the second management range 20 is retained in the failure DB 22. An aspect of the management range is not limited thereto, and a larger number of management ranges may be formed. At this time, the failure DB may be disposed in each of a plurality of management ranges.

Figure 12:
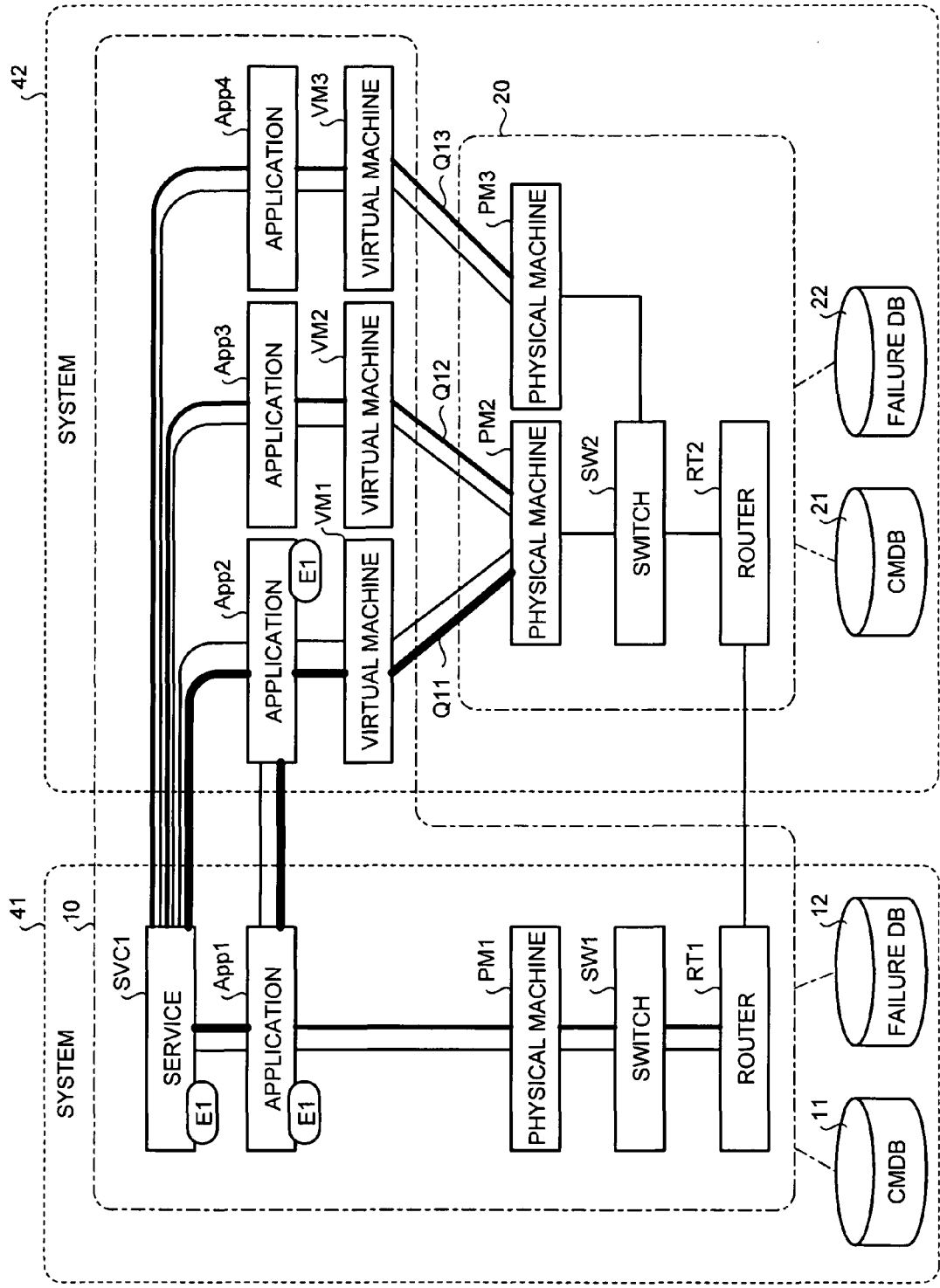
FIG. 12 is an explanation diagram for explaining a concrete example of a search for an abnormality starting point candidate (second)

FIG. 12 is an explanation diagram for explaining a case in which an error E1 in which the response time of an application deteriorates has occurred in the application App2 of the first management range 10.

Since as the cause that deteriorates the response time of the application, for example, there is a release omission of an object in a Java (a registered trademark) application, a large garbage collection (GC) sometimes occurs, so that the response time of the application may be tens of seconds.

If the error E1 has occurred in App2, the response time of the application App1 or the service SVC1 that depends on the application App2 also deteriorates, so that the error E1 occurs. The deterioration of the response time is detected when the response time threshold previously decided by an administrator of the first management range 10 through operation management software is exceeded. For example, the response time threshold is 3 seconds.

In the example illustrated in FIG. 12, the errors E1 of the service SVC1 and the applications App1 and App2 that have occurred in the first management range 10 are registered to the failure DB 12. A description will be made in connection with a case in which the search device 13 evaluates the abnormality starting point candidate using the three errors.

The search device 13 selects the service SVC1 from among the service SVC1 and the applications App1 and App2 based on the kind of the configuration item. The search device 13 traces the relation by using the selected service SVC1 as a starting point of the search and, at the same time, calculates the score on the configuration item that the abnormality has occurred among the configuration items present on the traced path, for example, using the calculation method illustrated in Equation (1).

The service SVC1 that is the starting point of the search has 1 (one) as the number of its own abnormalities, and there is no configuration item at the downstream of the relation. Thus, the score calculated by using Equation (1) is 1 (=1+0). The configuration items that can be traced from the service SVC1 are the applications App1 to App4.

The application App1 has 1 (one) as the number of its own abnormalities and the service SVC1 is present as the configuration item at the downstream thereof. Thus, a total score obtained by adding the score (1) of the SVC1 to the number (1) of its own abnormalities (1+1) is 2. The configuration items that can be traced from the application App1 are the physical machine PM1 and the application App2. The switch SW1 and the router RT1 are present on the path that can be traced from the physical machine PM1, but since the abnormality has not occurred in the physical machine PM1, the switch SW1, and the router RT1, the score is not calculated.

The application App2 has 1 (one) as the number of its own abnormalities, and the service SVC1 and the application App1 are present as the configuration items at the downstream thereof. Thus, the total score of the application App2 obtained by adding the score (1) of the SVC1 and the score (2) of the application App1 to the number (1) of its own abnormalities is 4. The configuration item that can be traced from the application App2 is the virtual machine VM1.

Figure 13:
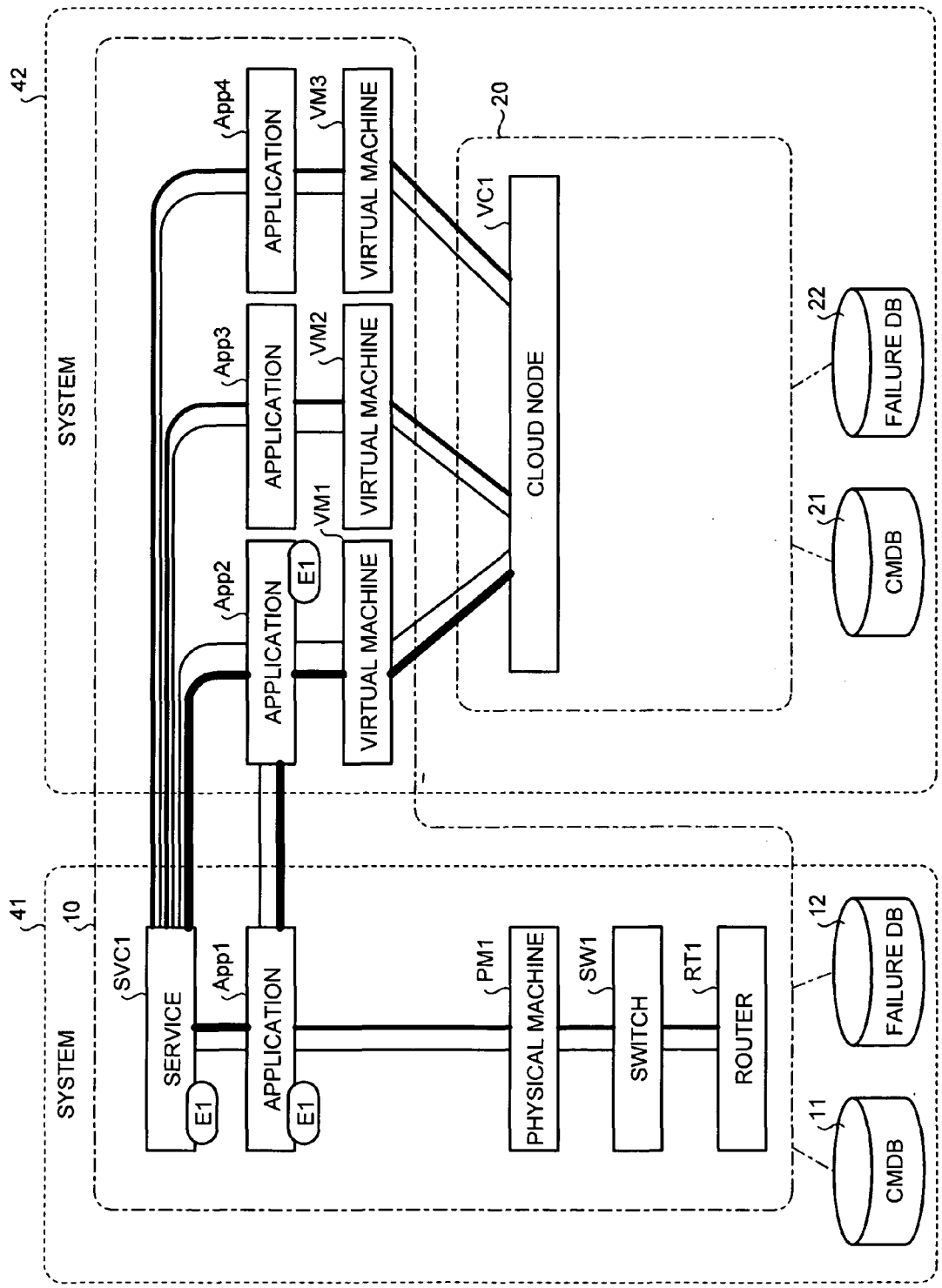
FIG. 13 is an explanation diagram for explaining a concrete example of a search for an abnormality starting point candidate (third)

Since the abnormality has not occurred in the virtual machine VM1, the score is not calculated. If the relation is further traced from the virtual machine VM1, the second management range 20 is reached. Here, the search device 13 recognizes the second management range 20 as one configuration item, i.e., a cloud node VC1 as illustrated in FIG. 13. Since the traced point is the cloud node VC1, the search device 13 issues a query Q11 to the search device 23 that searches for the abnormality starting point candidate of the second management range 20. The query Q11 includes information related of the relation set between the virtual machine VM1 and the cloud node VC1 and information of the abnormality of the search starting point. Further, the number of hops up to the relation included in the query Q11 or the maximum number of hops may be included.

The search device 23 receives the query and performs the search on the abnormality starting point candidate in the second management range 20. Specifically, the abnormality starting point candidate is searched by tracing the relation by using the relation with the virtual machine VM1 designated in the query Q11 as the starting point. In the example illustrated in FIG. 12, since the relation between the virtual machine VM1 and the physical machine PM2 is designated by the query Q11, the relation is traced starting from the physical machine PM2. However, since the abnormality has not occurred in the second management range 20, the search device 23 transmits a response representing that there is no starting point candidate to the query Q11.

The applications App3 and App4 can be traced from the service SVC1, but since the abnormality has not occurred, the score is not calculated. The configuration item that can be traced from the application App3 is the virtual machine VM2, and if the relation is further traced from the virtual machine VM2, the cloud node VC1 corresponding to the second management range 20 is reached. Similarly, the configuration item that can be traced from the application App4 is the virtual machine VM3, and if the relation is further traced from the virtual machine VM3, the cloud node VC1 corresponding to the second management range 20 is reached.

The search device 13 issues the queries Q11 and Q12 even when the relation is traced from the virtual machines VM2 and VM3 so as to reach the cloud node VC1. The queries Q12 and Q13 include information related of the relation set between the virtual machines VM2 and VM3 and the cloud node VC1 and information of the abnormality of the search starting point. The search device 23 receives the queries Q12 and Q13 and searches for the abnormality starting point candidate in the second management range 20. Since the abnormality has not occurred in the second management range 20, the search device 23 transmits a response representing that there is no starting point candidate.

As described above, in the example illustrated in FIG. 12, if the search is performed using the service SVC1 as the starting point, since the application App2 is the configuration item in which the abnormality has occurred at the most upstream, the application App 2 (the score is 4) becomes the abnormality starting point candidate.

In the process of performing the search using the service SVC1 as the starting point, the evaluation on the applications App1 and App2 that are the other configuration items in which the abnormality has occurred has been performed. Thus, the search using the applications App1 and App2 as the starting point becomes unnecessary. Accordingly, in the example illustrated in FIG. 12, the search device 13 regards the application App2 (the score is 4) as the abnormality starting point candidate.

In the example illustrated in FIG. 12, the number of abnormality starting point candidates is 1 (one), but if a plurality of abnormality starting point candidates is present, the search device 13 outputs a plurality of abnormality starting point candidates together with their scores. For example, when a plurality of abnormalities has simultaneously occurred or when the candidate could not be picked out even if one actual starting point is present, a plurality of starting point candidates is output. Further, the score may be calculated using any other method for quantifying a probability to be the abnormality starting point. Further, a method of conferring the score even to the configuration item in which abnormality has not occurred as the abnormality starting point candidate may be used.

Figure 14:
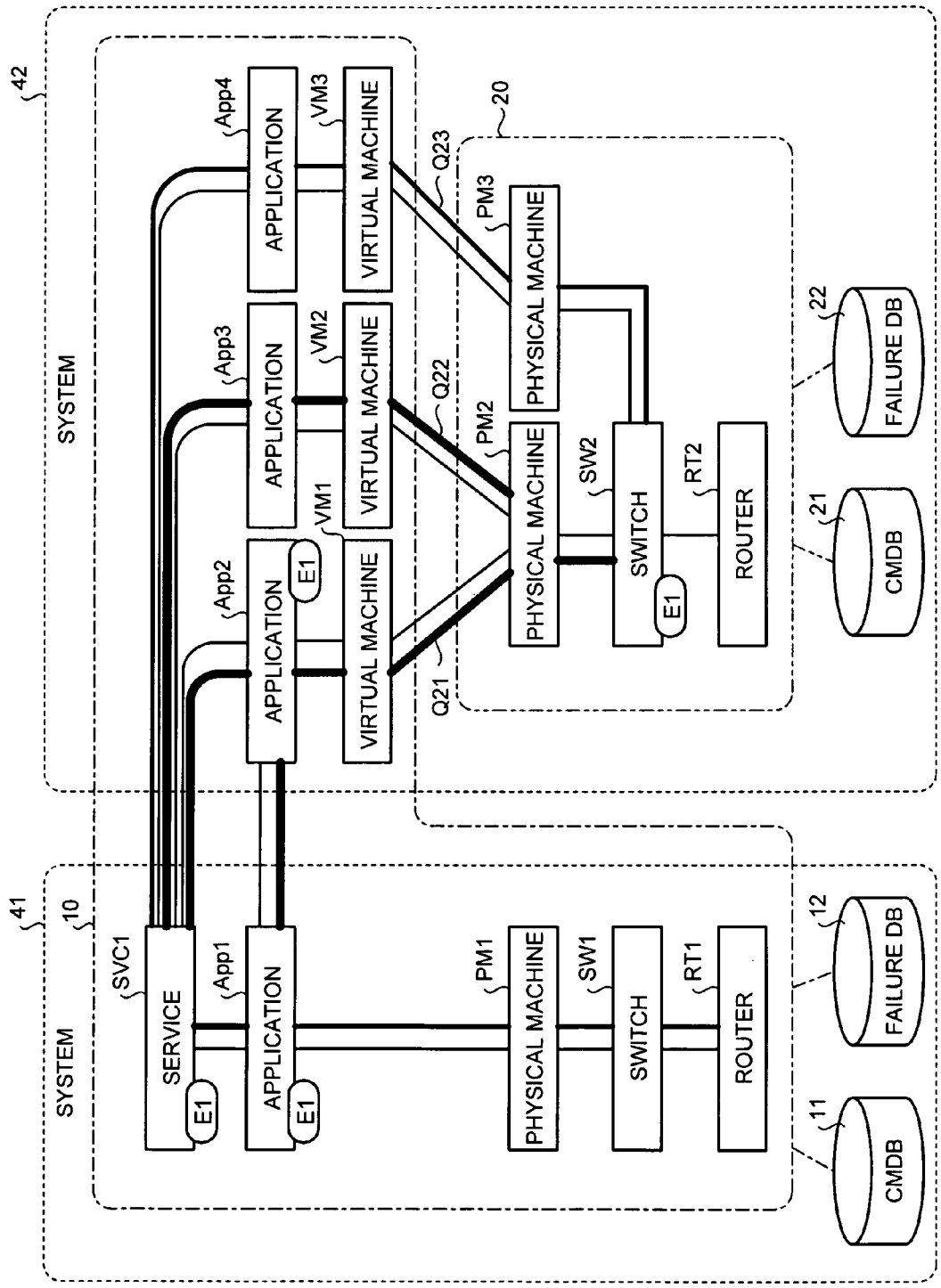
FIG. 14 is an explanation diagram for explaining a concrete example of a search for an abnormality starting point candidate (fourth)

FIG. 14 is an explanation diagram for explaining a case in which an error E1 in which the response time deteriorates due to congestion has occurred in the switch SW2 of the second management range 20.

If congestion occurs a layer 2 (L2) switch such as the switch SW2, a part of IP packets is discarded in an upper-order application such as the applications App2 and App3. Transmission control protocol (TCP) layers of the virtual machines VM1 and VM2 wait for a moment (for example, after 3 seconds, and if further discarded, after 6 seconds) and performs retransmission (an error E2) of the IP packet. As a result, the response time of the applications App1 and App2 increase to 3 seconds and 6 seconds. Further, the response time of the application App1 or the service SVC1 that depends on the application App2 deteriorates (the error E1).

The deterioration of the response time is detected when the response time threshold (for example, 3 seconds) previously decided by an administrator through operation management software is exceeded. Further, in the switch SW2 and the virtual machines VM1 and VM2, when the number of times of TCP retransmission or a packet discard rate measured by the operation management software increases, it is detected as the abnormality.

In the example illustrated in FIG. 14, the errors EN1 of the service SVC1 and the applications App1 to App3 and the errors E2 of the virtual machines VM1 and VM2 that have occurred in the first management range 10 are registered to the failure DB 12. Further, the error EN1 of the switch SW2 that has occurred in the second management range 20 is registered to the failure DB 22. A description will be made in connection with a case in which the search devices 13 and 23 evaluate the abnormality starting point candidate based on the seven errors.

The search device 13 first selects the service SVC1 from among the service SVC1, the applications App1 to App3, and the virtual machines VM1 and VM2 in which the abnormality has occurred in the first management range 10 based on the kind of the configuration item. The search device 13 traces the relation by using the selected service SVC1 as a starting point of the search and, at the same time, calculates the score on the configuration item that the abnormality has occurred among the configuration items present on the traced path, for example, using the calculation method illustrated in Equation (1).

Similarly to the example of FIG. 12, the score of the service SVC1 is 1 (one), the score of the application App1 is 2 (two), and the score of the application App2 is 4 (four). Among the configuration items that can be traced from the application App1, the abnormality has not occurred in the physical machine PM1, the switch SW1, and the router RT1, and thus the score is not calculated similarly to the example of FIG. 12.

In the example illustrated in FIG. 14, the virtual machine VM1 that can be traced from the application App2 obtains the total score (5) by adding the score (4) of the application App2 to the number (1) of its own abnormalities (1+4).

The application App3 has 1 (one) as the number of its own abnormalities and the service SVC1 is present as the configuration item at the downstream thereof. Thus, the total score of the application App3 obtained by adding the score (1) of the SVC1 to the number (1) of its own abnormalities (1+1) is 2. The configuration item that can be traced from the application App3 is the virtual machine VM2.

The virtual machine VM2 obtains the total score (3) by adding the score (2) of the application App3 to the number (1) of its own abnormalities (1+2).

If the relation is further traced from the virtual machine VM1, the second management range 20 is reached. Here, the search device 13 recognizes the second management range 20 as one configuration item, i.e., the cloud node VC1 as illustrated in FIG. 14. Since the traced place is the cloud node VC1, the search device 13 issues a query Q21 to the search device 23 that searches for the abnormality starting point candidate of the second management range 20. The query Q21 includes information related of the relation set between the virtual machine VM1 and the cloud node VC1 and information of the abnormality of the search starting point. Further, the number of hops up to the relation included in the query Q11 or the maximum number of hops may be included.

Similarly, if the relation is further traced from the virtual machine VM2, the cloud node VC1 corresponding to the second management range 20 is reached. When the relation is traced from the virtual machine VM2 and so reaches the cloud node VC1, the search device 13 issues a query Q22 to the search device 23. The query Q22 includes information related of the relation set between the virtual machine VM2 and the cloud node VC1 and information of the abnormality of the search starting point.

The application App4 can be traced from the service SVC1, but since the abnormality has not occurred, the score is not calculated. The configuration item that can be traced from the application App4 is the virtual machine VM3, and if the relation is further traced from the virtual machine VM3, the cloud node VC1 is reached. When the relation is traced from the virtual machine VM3 and so reaches the cloud node VC1, the search device 13 issues a query Q23 to the search device 23. The query Q23 includes information related of the relation set between the virtual machine VM3 and the cloud node VC1 and information of the abnormality of the search starting point.

The queries Q21 to Q23 issued by the search device 13 are queries issued during the abnormal search processes having the same starting point, and as the identification information of the query, the same identification information (for example, the query ID 100) may be used.

The search device 23 receives the queries Q21 to Q23 and performs the search on the abnormality starting point candidate in the second management range 20. Specifically, the abnormality starting point candidate is searched by tracing the relation by using the relation with the virtual machines VM1 to VM3 designated in the queries Q21 to Q23 as the starting point, respectively. The query Q21 designates the relation between the virtual machine VM1 and the physical machine PM2. The query Q22 designates the relation between the virtual machine VM2 and the physical machine PM2. The query Q23 designates the relation between the virtual machine VM3 and the physical machine PM3.

Preferably, the first management range side does not manage the configuration items of the second management range that are connected with the virtual machines VM1 to VM3, a relationship with identification information (for example, r01 to r03) of a connection relationship between VM1 to VM3 and the configuration items of the second management range are stored in the CMDB, and the identification information r01 to r03 are included in the queries Q21 to Q23, respectively. The second management range side does not manage the configuration items of the first management range that are connected with the physical machines PM2 and PM3, a relationship with identification information (for example, r01 to r03) of a connection relationship between the physical machines PM2 and PM3 and the configuration items of the first management range are stored in the CMDB. Thus, it is possible to specify the physical machines PM2 and PM3 based on the identification information r01 to r03 included in the queries and perform the search on the abnormality starting point.

If the search device 23 starts the search based on the query Q21 and traces the relation, the physical machine PM2, the switch SW2, and the router RT2 are reached. Since the error E2 has been registered to the failure DB 22 on the switch SW2, the search device 23 confers the score (1) to the query Q21 issued by using the virtual machine VM1 as the starting point, replaces the switch SW2 with the dummy configuration item VC001, and responds to the query Q21.

If the search device 23 starts the search based on the query Q22 and traces the relation, the physical machine PM2, the switch SW2, and the router RT2 are reached. Since the error E2 has been registered to the failure DB 22 on the switch SW2, the search device 23 confers the score (1) to the query Q22 issued by using the virtual machine VM2 as the starting point, replaces the switch SW2 with the dummy configuration item VC001, and responds to the query Q22.

If the search device 23 starts the search based on the query Q23 and traces the relation, the physical machine PM3, the switch SW2, and the router RT2 are reached. Since the error E2 has been registered to the failure DB 22 on the switch SW2, the search device 23 confers the score (1) to the query Q23 issued by using the virtual machine VM1 as the starting point, replaces the switch SW2 with the dummy configuration item VC001, and responds to the query Q23.

The search device 23 recognizes that the configuration item VC001 is present at the upstream of the virtual machines VM1 to VM3 and the score of the configuration item VC001 in the second management range is 1 (one) based on the responses to the queries Q21 to Q23. Thus, the search device 23 adds the score of the downstream side to the score (1) of the configuration item VC001 in the second management range and uses it as the configuration item VC001.

Thus, a total score of the configuration item VC001 obtained by adding the score (5) of the virtual machine VM1, the score (3) of the virtual machine VM2, and the score (1) of the service SVC1 positioned at the downstream of the virtual machine VM3 to the score (1) of the configuration item VC001 in the second management range (1+5+3+1) is 10 (ten).

As described above, in the example illustrated in FIG. 14, if the search is performed using the service SVC1 as the starting point, since the dummy configuration item VC001 is the configuration item in which the abnormality has occurred at the most upstream, the dummy configuration item VC001 (the score is 10) becomes the abnormality starting point candidate.

In the process of performing the search using the service SVC1 as the starting point, the evaluation on the applications App1 to App3 and the virtual machines VM1 and VM2 that are the other configuration items in which abnormality has occurred has been performed. Thus, the search using the applications App1 to App3 and the virtual machines VM1 and VM2 as the starting point becomes unnecessary. Accordingly, in the example illustrated in FIG. 14, the search device 13 uses the dummy configuration item VC001 (the score is 10) as the abnormality starting point candidate.

This result represents that there is a high possibility that the dummy configuration item VC001 will be the abnormality starting point, that is, there is a high possibility that the second management range side will have responsibility for the abnormality.

In the example illustrated in FIG. 14, the number of abnormality starting point candidates is 1 (One), but if a plurality of abnormality starting point candidates is present, the search device 13 outputs a plurality of abnormality starting point candidates together with their scores. For example, when a plurality of abnormalities has simultaneously occurred or when the candidate could not be picked out even if one actual starting point is present, a plurality of starting point candidates is output. Further, the score may be calculated using any other method for quantifying a probability to be the abnormality starting point. Further, a method of conferring the score even to the configuration item in which abnormality has not occurred as the abnormality starting point candidate may be used.

Implementation by Program

Figure 15:
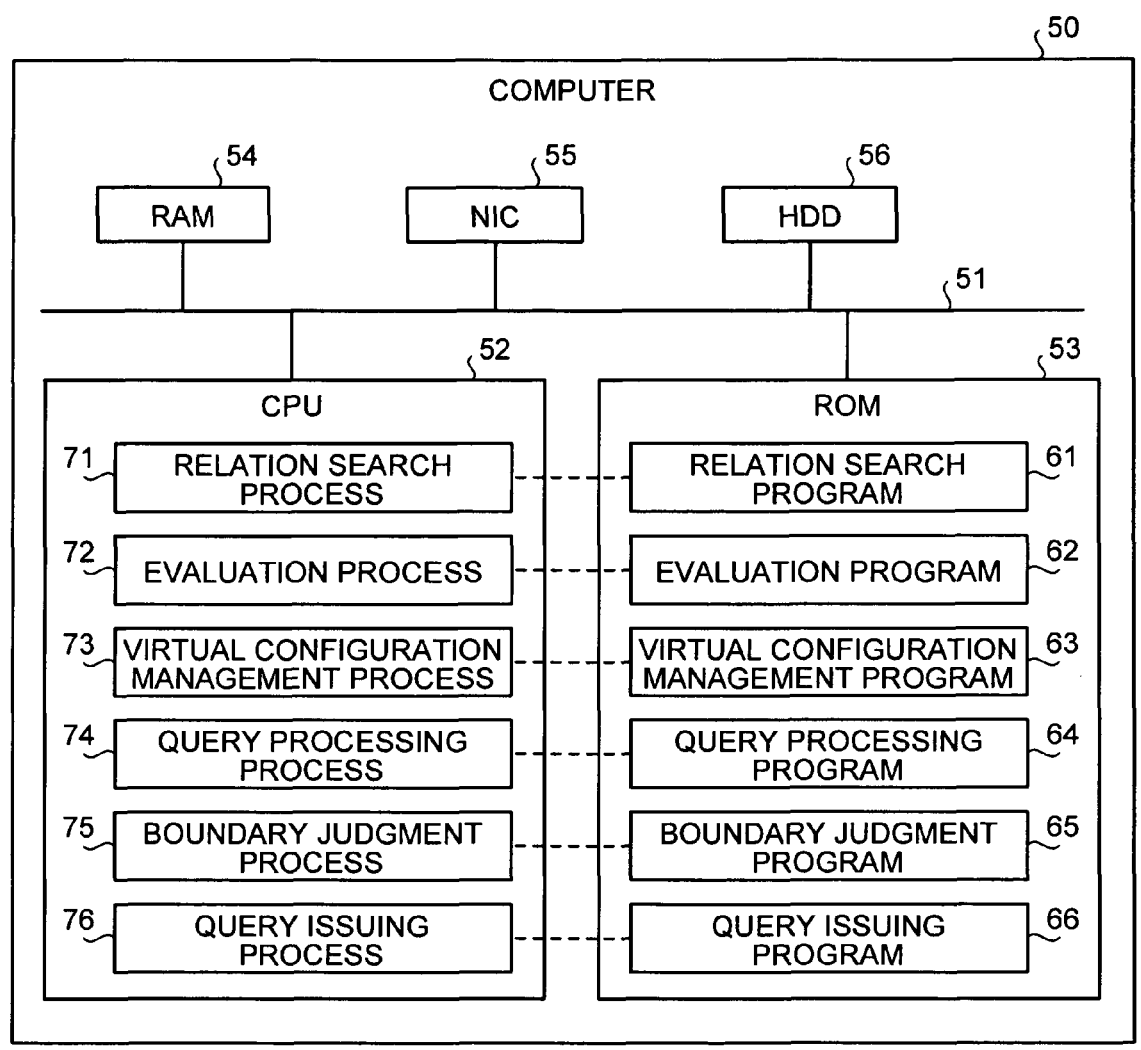
FIG. 15 is an explanation diagram for explaining a case in which a computer operates as a search device.

FIG. 15 is an explanation diagram for explaining a case in which a computer operates as a search device. A computer 50 illustrated in FIG. 15 includes a central processing unit (CPU) 52, a read only memory (ROM) 53, a random access memory (RAM) 54, a network interface card (NIC) 55, and a hard disk drive (HDD) 56, which are connected to each other via a bus 51.

The ROM 53 stores a relation search program 61, an evaluation program 62, a virtual configuration management program 63, a query processing program 64, a boundary judgment program 65, and a query issuing program 66. The ROM 53 has been described as an example of a tangible recording medium, but various programs may be stored in any other tangible computer readable recording medium such as a HDD, a RAM, and a CD-ROM and read by the computer. Further, a tangible storage medium may be disposed at a remote site, and a program may be acquired and used by accessing the tangible storage medium through the computer. At this time, the acquired program may be stored in a tangible recording medium of the computer and used.

The CPU 52 reads out and executes the relation search program 61 and implements the same operation as the relation search unit 32 as a relation search process 71. Further, the CPU 52 reads out and executes the evaluation program 62 and implements the same operation as the evaluation unit 37 as an evaluation process 72. The CPU 52 reads out and executes the virtual configuration management program 63 and implements the same operation as the virtual configuration management unit 36 as a virtual configuration management process 73. The CPU 52 reads out and executes the query processing program 64 and implements the same operation as the query processing unit 35 as a query processing process 74. The CPU 52 reads out and executes the boundary judgment program 65 and implements the same operation as the boundary judgment unit 33 as a boundary judgment process 75. The CPU 52 reads out and executes the query issuing program 66 and implements the same operation as the query issuing unit 34 as a query issuing process 76.

As described above, the various programs stored in the ROM 53 function as apart of the search program. The computer 50 reads out and executes the various programs from the ROM 53 and operates as the search device that executes the search method.

Configuration Having Three or More Domains

The network system having the first management range and the second management range have been described above, but the present invention can be applied to a network system having three or more management ranges.

Figure 16:
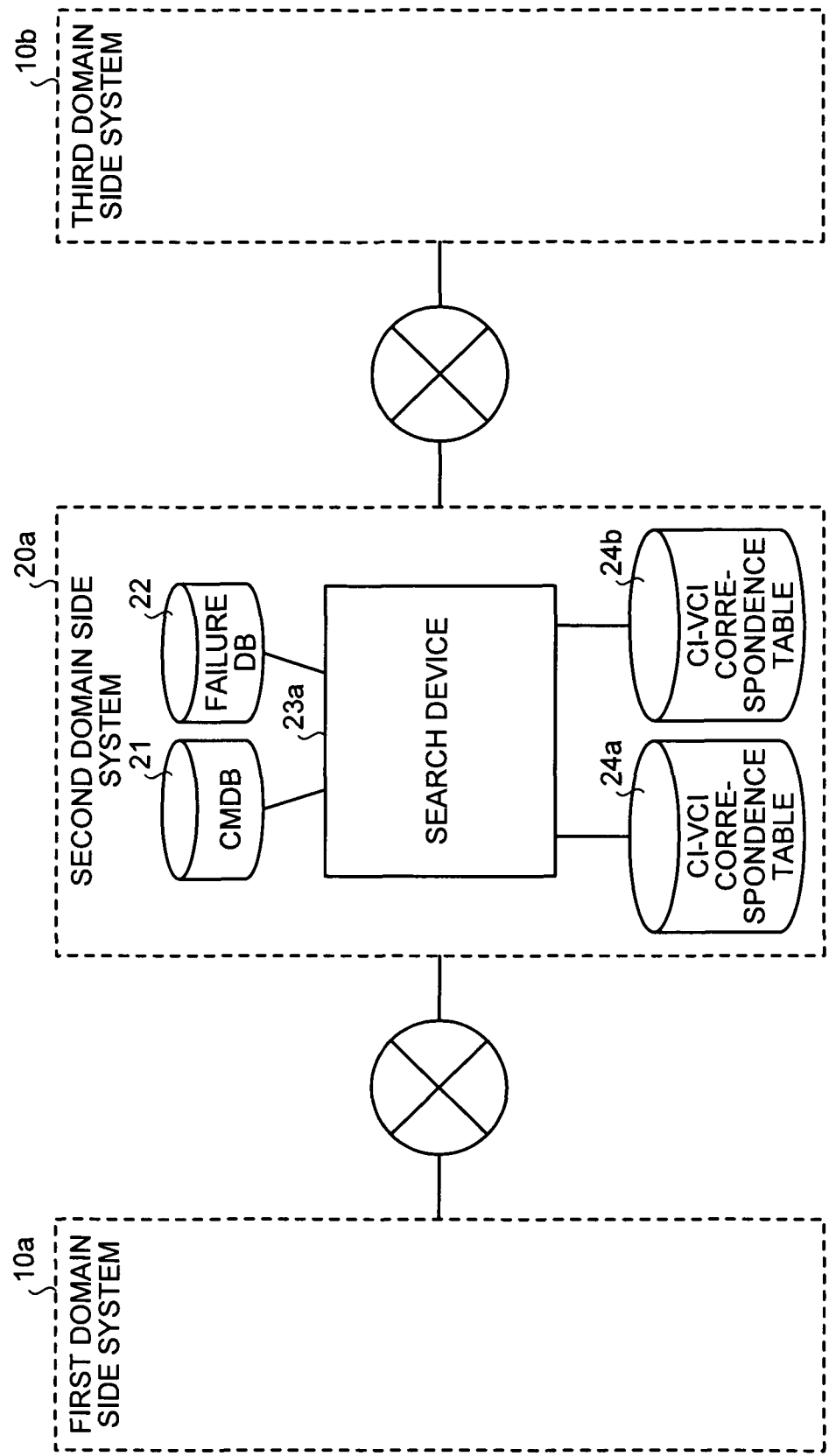
FIG. 16 is an explanation diagram for explaining a network system having three management ranges.

FIG. 16 is an explanation diagram for explaining a network system having three management ranges. In a configuration illustrated in FIG. 16, a second domain side system 20a corresponding to a second management range is connected with a first domain side system 10a corresponding to a first management range and a third domain side system 10b corresponding to a third management range.

The second domain side system 20a includes a search device 23a, a CMDB 21, the failure DB 22, and CI-VCI correspondence tables 24a and 24b. The search device 23a is connected to a search device in the first domain side system 10a and a search device in the third domain side system 10b, respectively.

The CMDB 21 stores connection information of the configuration item in the second domain. The failure DB 22 stores information of a failure occurred in the second domain. The CI-VCI correspondence table 24a stores a correspondence relationship between a dummy configuration item used when responding to the query from the first domain side system 10a and an actual configuration item. The CI-VCI correspondence table 24b stores a correspondence relationship between a dummy configuration item used when responding to the query from the third domain side system 10b and an actual configuration item.

If the CI-VCI correspondence table of each domain is individually managed as described above, it is possible to set different VCIs on the same configuration item even if the query ID is the same, and thus it is possible to prevent a configuration of the second domain from being exposed.

Further, even when there is a single CI-VCI correspondence table, by separating treating a query ID that is allowed to use in each domain, an inference of the configuration information by superposition of the query response can be avoided. When the query ID is shared by the domains, when the query to which the same query ID is conferred is transmitted from the different domains, common dummy configuration item information is transmitted to the common configuration item as a response. In this case, since the response is superimposed between the different domains, the configuration of the second domain is exposed. However, by separately treating a query ID that is allowed to use in each domain, the above situation can be avoided Summary of Second Exemplary Embodiment As described above, the search device, the search method, and the search program according to the second exemplary embodiment can evaluate the starting point candidate of the abnormality occurred in the system.

The search device according to the second exemplary embodiment transmits the dummy configuration item on the query from another search device and virtualizes the configuration of its own domain. For this reason, the search device can notify another search device of the abnormality starting point candidate through the virtual configuration while concealing an actual configuration of its own domain. Thus, the configuration of each domain is not known to each other, and the configuration item that is the abnormality start point can be inferred, and a domain in which the starting point of the occurred abnormality is present can be investigated.

The device, the method, and the program disclosed in the exemplary embodiments are exemplary, and a configuration and operation thereof can be appropriately changed and implemented. For example, the processing units of the device disclosed in the second exemplary embodiment may be disposed on the network system in a dispersed manner and may be implemented as the search system.

A candidate of the starting point of the abnormality occurred in the system can be effectively searched for.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search device comprising:
   a query processing unit that receives a query that requests a search on a starting point candidate of an abnormality based on at least one error belonging to a second management range, indicating a range of a configuration items managed by a second search device in a network, from a device that searches for a starting point candidate of an abnormality based on at least one error in the configuration item belonging to a first management range, indicating a range of the configuration items managed by a first search device in the network;
   a search unit that traces a connection relationship of configuration items belonging to the second management range based on the query and searches for a candidate of a configuration item that is a starting point of the abnormality as a starting point candidate of the abnormality;
   an evaluation unit that evaluates the starting point candidate of the abnormality based on a search result of the search unit; and
   a dummy processing unit that replaces a configuration item that is a starting point candidate of the abnormality searched by the search unit with a dummy configuration item that is non-persistent identification information and indicates the configuration item of the abnormality starting point candidate,
   wherein the query processing unit transmits the dummy configuration item and an evaluation result of the evaluation unit as a response to the query.

2. The search device according to claim 1,
   wherein the query has the same identification information on the same abnormality, and the dummy processing unit replaces the configuration item that is the starting point candidate of the abnormality with the same dummy configuration item on the query having the same identification information.

3. The search device according to claim 1,
   wherein the dummy processing unit individually manages a correspondence relationship between a configuration item that is a starting point candidate of an abnormality based on at least one error and a dummy configuration item, which is used to respond to a query from the first management range and a correspondence relationship between a configuration item that is a starting point candidate of an abnormality based on at least one error and a dummy configuration item, which is used to respond to a query from a third management range, indicating a range of the configuration items managed by a third device.

4. A searching method comprising:
   receiving a query that requests a search on a starting point candidate of an abnormality based on at least one error belonging to a second management range, indicating a range of a configuration items managed by a second search device in a network, from a device that searches for a starting point candidate of an abnormality based on at least one error in a configuration item belonging to a first management range, indicating a range of the configuration items managed by a first search device in the network;
   tracing a connection relationship of configuration items belonging to the second management range based on the query;
   searching for a candidate of a configuration item that is a starting point of the abnormality as a starting point candidate of the abnormality; evaluating the starting point candidate of the abnormality based on a searching result;
   replacing a configuration item that is a starting point candidate of the abnormality with a dummy configuration item that is non-persistent identification information and indicates the configuration item of the abnormality starting point candidate; and
   transmitting the dummy configuration item and an evaluating result as a response to the query.

5. A computer-readable, non-transitory medium storing a searching program for causing a searching apparatus to execute a process, the process comprising:
   receiving a query that requests a search on a starting point candidate of an abnormality based on at least one error belonging to a second management range, indicating a range of a configuration items managed by a second search device in a network, from a device that searches for a starting point candidate of an abnormality based on at least one error in a configuration item belonging to a first management range, indicating a range of the configuration items managed by a first search device in the network;
   tracing a connection relationship of configuration items belonging to the second management range based on the query;
   searching for a candidate of a configuration item that is a starting point of the abnormality as a starting point candidate of the abnormality;
   evaluating the starting point candidate of the abnormality based on a searching result;
   replacing a configuration item that is a starting point candidate of the abnormality with a dummy configuration item; and
   transmitting the dummy configuration item that is non-persistent identification information and indicates the configuration item of the abnormality starting point candidate, and an evaluating result as a response to the query.

6. A network system including a first search device managing a first management range and a second search device managing device a second management range,
   wherein
   the first search device comprises:
   a first search unit that, on an abnormality based on at least one error occurred in a configuration item belonging to the first management range, indicating a range of the configuration items managed by the first search device in a network, traces a connection relationship of a configuration item in which the abnormality based on at least one error has occurred and searches for a candidate of a configuration item that is a starting point of the abnormality as a starting point candidate of the abnormality;

a query issuing unit that issues a query that requests the second search device to search for the starting point candidate of the abnormality when a configuration item of a point traced by the first search unit is a configuration item belonging to the second management range, indicating a range of a configuration items managed by the second search device in the network; and a first evaluation unit that evaluates the starting point candidate of the abnormality based on a search result of the first search unit and a response to the query, and the second device comprises:

a query processing unit that receives the query issued by the query issuing unit;

a second search unit that traces a connection relationship of configuration items belonging to the second management range based on the query and searches for a candidate of a configuration item that is a starting point of the abnormality as a starting point candidate of the abnormality;

a second evaluation unit that evaluates the starting point candidate of the abnormality based on a search result of the second search unit; and a dummy processing unit that replaces a configuration item that is a starting point candidate of the abnormality searched by the second search unit with a dummy configuration item that is non-persistent identification information and indicates the configuration item of the abnormality starting point candidate, wherein the query processing unit transmits the dummy configuration item and an evaluation result of the second evaluation unit as the response to the query.

* * * * *